United States Patent Office 3,089,774
Patented May 14, 1963

3,089,774
METHOD OF PRODUCING A BAKERS' YEAST
Robert J. Sumner, Kirkwood, William A. Hardwick, Olivette, Robert D. Seeley, Webster Groves, and Homer F. Ziegler, Jr., Glendale, Mo., assignors to Anheuser-Busch, Inc., St. Louis, Mo., a corporation of Missouri
No Drawing. Filed May 29, 1959, Ser. No. 816,671
13 Claims. (Cl. 99—96)

This invention relates to an improved bakers' yeast and to a novel process of making same. The present invention relates particularly to a bakers' yeast which has substantially all of the advantages of fresh compressed yeast, and which has better stability during storage and contains less bulk.

Historically, bakers' yeast has been produced either as a compressed cake containing about 70% moisture, or as active dry yeast having from 6% to 10% moisture. Both of these forms have limitations which impose considerable expense on both the producer and the consumer.

Compressed yeast is prepared by washing the yeast produced in a fermentor and concentrating it to a cream. The yeast cream is passed through filter presses or drums where the yeast is compressed into a cake of about 67% moisture. Additional moisture is added in the form of shaved ice with mixing to obtain the proper consistency for extruding and subsequently cutting the yeast cake to a desired size. The yeast must be kept cold during processing, shipping, and storage, or it will not perform satisfactorily for the baker. The yeast has a tendency to generate heat during storage, thus putting an additional load on the cooling equipment and increasing the cost of shipping and storing. Its high moisture content also greatly increases the bulk which must be shipped and handled and makes the yeast quite susceptible to spoilage due to incidental contaminating bacteria. Even kept cold, compressed yeast should be used within about two weeks.

Active dry yeast is prepared by taking compressed yeast, extruding it as small particles, and drying the particles in an ambient air stream until the moisture content is from 6–10%, usually about 8%. Drying to such low moisture levels requires the use of expensive drying equipment and control devices. Active dry yeast is costly to use since the final low moisture level is difficult to obtain without losing fermenting power. Enough fermenting power is lost under ideal conditions to make it necessary for a baker to use substantially more active dry yeast (approximately 22% more yeast solids) than compressed yeast on a dry weight basis to obtain his desired loaf volume in the scheduled time. Increased yeast solids in the formula or prolonged ferementation time cause an added expense to the baker. Both loaf volume and texture are frequently poor in bread made from active dry yeast. This is largely due to the greatly increased glutathione, as more fully described hereinafter, which is present in the active dry yeast.

Also active dry yeast must be handled carefully by the baker when it is reconstituted to slurry form prior to its addition to the dough. Unless the temperature of the water used is adjusted to about 110° F., the yeast will undergo a drastic change causing loss of its fermenting ability. This condition is generally referred to as "cold shock" and requires special water tempering tanks for proper rehydration. Thus, the baker using conventional active dry yeast is confronted with variabilities in fermentation performance, dough processing and bread quality. The present invention provides a greatly improved bakers' yeast which possesses the rapid fermenting ability of compressed yeast, which has better stability during storage than does compressed yeast, which is not susceptible to spoilage by incidental contaminating bacteria, which has low glutathione activity, which is not susceptible to cold shock, and which is much simpler to prepare than convention active dry yeast, and a novel process for producing said yeast.

A principal object of the present invention is to provide a superior type of bakers' yeast. Another object of this invention is to provide a method of producing such a bakers' yeast including the step of drying pressed yeast to a moisture content of from about 15% to about 25%.

A further object of the present invention is to provide a bakers' yeast having a reduced moisture content which has greater stability during storage than pressed yeast cake.

Another object of the present invention is to provide a bakers' yeast which has reduced moisture content, but does not have an increased glutathione activity or "cold shock" susceptibility.

Still another object of the present invention is to provide a new type of bakers' yeast which has essentially no loss in baking strength and which has a greater resistance to the development of contaminating bacteria due to its reduced moisture content.

These and other objects and advantages of this invention will become apparent in the following discussion and disclosures.

Briefly, the present invention comprises a bakers' yeast having rapid fermenting ability, stability during storage, little susceptibility to spoilage by contaminating bacteria, low proteolytic activity, no susceptibility to cold shock, and a moisture content of from about 15% to about 25%. The invention further comprises the novel method of preparing such a bakers' yeast including the step of drying yeast to a moisture content of from about 15% to about 25%.

The invention further consists in the novel yeast hereinafter described and claimed, and in the novel method of producing said yeast.

A detailed description of the present invention follows:

Proteolytic activity as well as general quality of the yeast can be determined by measuring glutathione content. This is believed to be caused by release of glutathione by endogenous metabolism of the yeast, and procedures have been given for selection of a yeast having a naturally low glutathione content or for culturing a yeast with aeration to obtain desired low levels of glutathione (Chemical Abstracts 37:3788 and U.S. Patent No. 2,717,837).

However, in the present invention it is not necessary to exercise either of these practices to obtain a yeast with optimally low levels of glutathione. Abnormally high levels of glutathione in yeast occur when it has been grown under conditions which are not conducive to the production of a good bakers' yeast, such as the use of a culture medium which causes abnormally high protein production by the yeast. A yeast having a high protein content does not contain the desirable levels of stored carbohydrate which protect the yeast during air drying.

A good bakers' yeast contains adequate stored carbohydrate if its protein content is between about 48% and about 38%. The yeast should also have a $P_2O_5$ value of between about 1.8 to about 2.4 percent.

The stored carbohydrate seems to function as a reserve material which can be auto-digested during the drying cycle by those enzymes essential to carbon dioxide ($CO_2$) production, thus maintaining the enzymes in a state of activity during drying.

The carbon dioxide producing or gassing enzymes are susceptible to damage in several ways. They can be deprived of their carbon dioxide producing power by proteolytic enzymes. The stored carbohydrate protects the carbon dioxide producing enzymes from the action of the proteolytic enzymes. Therefore if there is not enough stored carbohydrate present in the yeast cell, there is an increase in proteolytic activity. Thus, a controlled level of protein is necessary in the starting yeast product. In addition to glutathione content another measure of proteolytic activity in the yeast is the loss of gassing power caused by the inactivation of the carbon dioxide producing enzymes by other proteins. When yeast having a high glutathione activity is used in baking bread, a dough softening effect occurs, and the resulting bread has a coarser texture, is more crumbly and has less volume.

The procedure for measuring the glutathione content is as follows:

10 grams of yeast is weighed carefully and is suspended in 76 ml. of water. After standing for 30 minutes, the supernatant fluid is collected by centrifugation and is filtered clear. 20 milliliters (ml.) of the fluid is placed into a flask and 25 ml. of a 3% solution of sulfosalicylic acid, 10 ml. of a 5% solution of potassium iodide, and about 6 drops of a 2% starch solution are added thereto. This mixture is titrated to a deep blue using a 0.001 N solution of potassium iodate. Comparative values are obtained which are generally expressed in terms of ml. of 0.001 N potassium iodate required to titrate the glutathione. A good bakers' yeast of about 45% protein can be dried to a moisture level of about 18% before its proteolytic activity and glutathione content increases to an undesirable and harmful level.

The following table gives the glutathione content of a bakers' yeast having about 45% protein when it is dried to varying moisture levels.

TABLE 1

*Percent Moisture of Yeast vs. Glutathione Value*

| Percent moisture: | Glutathione value |
| --- | --- |
| 35 | 2 |
| 25 | 2 |
| 22 | 3 |
| 20 | 4 |
| 18 | 7 |
| 16 | 10 |
| 14 | 20 |
| 12 | 28 |
| 7 | 48 |

Although the glutathione value shows a slight increase as air drying of the yeast progresses, it does not reach a level which significantly alters the function of the yeast until the moisture content of the yeast goes below about 16%. It is in an optimally low range when yeast moisture content is no lower than about 18%.

The phenomenon of "cold shock" susceptibility of commercial active dry yeast is not clearly understood. It has been known for some time that active dry yeast when suspended in cool or cold water undergoes drastic reduction of baking strength and viability of the yeast. When the supernatant from such a yeast suspension is studied, it is observed that significant quantities of vital substances are present which have been released by the yeast cells. These materials are essential to fermentation by the yeast, and this loss to the supernatant fluid constitutes an irreversible loss of fermentative capacity and of viability itself. This shock effect can only be minimized by resuspending conventional active dry yeast at warm temperatures of about 110° F. using careful handling and complicated procedures.

It would be advantageous to the baker if it were not necessary that he employ water at 110° F. to suspend the yeast, since it is a time consuming and expensive operation. If the final moisture content of the yeast of this invention is maintained above about 15%, it is not necessary for the baker to do this because "cold shock" susceptibility is avoided.

A conventional active dry yeast loses from 50% to 90% of its fermentation capacity depending upon the baking process when it is resuspended in water at a temperature of about 45° F., while a yeast made according to this invention and dried to a moisture content of from about 15% to about 25% loses less than 5% of its fermentation capacity compared to compressed yeast when resuspended in water at a temperature of about 45° F.

In the present invention, bakers' yeast is subjected in part to the same controlled drying procedure employed for the preparation of conventional active dry yeast. The drying operation is considerably simpler, however, since the yeast can be dried to a moisture content of about 20% in less than half the time required to produce conventional active dry yeast. Drying to below 16% moisture adversely affects the performance to the yeast unless the drying is rigidly controlled.

In the present invention the yeast is dried in ambient air at a temperature from about 90° F. to about 110° F., with the yeast at a temperature of about 85° F. A small variation in these temperatures can be affected under carefully controlled conditions.

The yeast is removed from the drying area or chamber when its moisture content is from about 15% to about 25%, and preferably from about 18% to about 22%. The best quality yeast has a moisture content of about 20%. The yeast at 15–25% moisture content is considerably lighter in color and is composed of discrete particles which resist reforming into a cake. It suspends readily into water.

The following experiment illustrates the advantages which are realized by carrying out our invention of drying to from about 15% to about 25% moisture:

Bakers' yeast pressed cake is extruded into conventional pellets or particles for drying and is exposed to a drying environment. Samples are taken periodically for determination of moisture and baking quality. The yeast is not allowed to reach a temperature above 100° F. during drying.

The samples vary in moisture content from 70% (initial pressed cake) to 8% (conventional active dry yeast level). Various performance tests are made with these samples, the amount of yeast being corrected to an equal dry solids basis. The conventional Blish Sandstedt test for carbon dioxide production is used, with minor modifications which allow the duplication of the three dough handling processes which are most commonly employed by bakeries.

In carrying out the Blish Sandstedt bake tests employed here, a conventional bakers' dough is prepared using mixing machinery and techniques quite similar to those employed in a bakery.

A highly uniform mixture of the dry ingredients, flour, sugar, and salts, is made up beforehand so that a standard supply of these dry ingredients will be available for use in several bake tests, thus avoiding any variation due to measuring errors on these ingredients when done on an individual dough basis. A precise amount of the yeast to be tested and water is mixed into a measured quantity of the standard dry ingredients to form a bread dough. After the dough is completely mixed, 36 grams of it are placed into a metal cup which is then attached to a manometer that will measure the fermentation gas produced. The metal cup is placed in a water bath at 30° C. and readings are taken at regular intervals. Thus, the total amount of carbon dioxide produced by the yeast in a bread dough can be measured with a high degree of accuracy.

Readings can be made for a total of either 2 hours or 4 hours depending on the baking process being studied. In the straight dough process readings are carried out over a 4 hour period, and in the sponge dough process the dough is not placed into the cup until the sponge period is completed and the dough is remixed. This test is then allowed to go for 2 hours.

Three dough handling procedures are studied since the bakers' yeast is placed under different fermentation environments in each of them. In the straight dough process, for example, all ingredients are mixed into the dough and the bread is baked after the yeast has been allowed to ferment both the sugars present in the flour and any added sugars.

The sponge dough process, on the other hand, is modified so that the baker may employ a more flexible method of handling his production schedule. This is accomplished by withholding any added sugar until the yeast has fermented the sugars from the primary ferment or sponge. The sponge is made up of a portion of the total flour and water along with the yeast and other optional ingredients such as mineral yeast food, malt, fungal enzymes, vitamins, enrichments, etc. Sugar, salt, shortening and other ingredients including the remainder of the flour and additional water to produce a dough of proper consistency are then added at the termination of the sponge fermentation period and the dough remixed after which time it is given a secondary fermentation prior to proofing and baking. This allows for better control and permits the production of bread of uniformly high quality with respect to volume and texture.

The brew process is a recently developed procedure for baking, and reduces the dough handling time in the bakery. In this process, the major portion of the bread ingredients except the flour and shortening are stirred into water in a large vat where the yeast is allowed to ferment the brew for several hours. This brew can then be mixed with the flour and shortening and baked, providing a greatly simplified operation.

Dough ingredients for all tests are blended initially and measured amounts of the blend are used. In order to avoid the effects of "cold shock" as previously described for yeast dried to moisture levels below about 15%, all yeast samples are resuspended in water at 110° F.

The following table, Table 2, gives results obtained when yeast samples are dried to varying moisture levels and are used for experimental baking by the sponge dough process.

TABLE 2

*Moisture Content vs. Gas Production of Yeast Employed in the Sponge Dough Process*

| Moisture content: | Dough gas ($CO_2$) evolved, mm. Hg |
|---|---|
| 28 | 497 |
| 25 | 487 |
| 21 | 473 |
| 8 | 400 |

As shown in Table 2, yeast which is dried to the 28, 25 and 21% moisture levels has the same general fermentation capacity in a bread dough test. The fermentation capacity at the 8% moisture level is so low as to be unacceptable for a normal bread making process.

In the brew process, the brew is made up several hours before it is used, and Table 3 shows how the improved yeast of the present invention functions in this process. The brew process can be duplicated at laboratory scale and the amount of gas produced in the final bread doughs is measured as before by using the Blish Sandstedt cups and manometers.

The following table summarizes results obtained from several experimental brew process bakes and indicates the results which can be expected of bakers' yeast dried to various moisture levels.

TABLE 3

*Moisture Content vs. Gas Production of Yeast Employed in the Brew Process*

| Moisture Content, percent | Activity in Brew | Final Dough, Gas ($CO_2$), mm. Hg |
|---|---|---|
| 70 | Highly Active | 620 |
| 25–30 | do | 570 |
| 16–25 | do | 560 |
| 8–16 | Slow | 472 |

Table 3 demonstrates that in the brew process the most significant loss of fermentation capacity in fresh yeast which has been dried is at a moisture level below about 16%.

When the straight dough process, the third process commonly employed by bakers, is performed in the laboratory using our improved bakers' yeast, results similar to those of the sponge dough process are obtained. Our yeast is approximately equally as effective as compressed cake when the moisture range is from about 15% to about 25%.

When the moisture range is from about 15% to about 25% our yeast is better than when it is dried to the conventional active dry yeast moisture level of 8%.

To test the yeast stability, yeast samples are dried to various moisture levels and are stored at 40° F. for extended periods of time prior to removal and test baking. This storage temperature was chosen because it is generally the same as the temperature maintained in the cold storage rooms of bakeries. The following table, Table 4, gives the results of test baking this yeast after storage.

TABLE 4

*Effect of Storage at 40° F. on Performance of Yeast Samples Varying in Moisture Content*

| Moisture Content of Yeast, percent | Loss of Fermentation Capacity | |
|---|---|---|
| | After 2 Weeks, percent | After 4 Weeks, percent |
| 70 | 5 | 13 |
| 24 | 4 | 0 |
| 22 | 0 | 0 |
| 20 | 0 | 0 |
| 16 | 0 | 8 |
| 8 | 0 | 0 |

Thus, where the moisture content of the yeast is reduced to 20% it is more stable than pressed cake and is certainly sufficiently stable to withstand the shipping and storage periods employed today for bakers' yeast. Yeast containing less than 25% moisture possesses satisfactory stability characteristics for commercial handling.

Another more recent use of bakers' yeast is in the production of doughs for quick-frozen rolls. The baker prepares a roll dough which is cut and quick-frozen to about −20° F. and is distributed frozen to retail outlets. Major problems encountered in this field include the extreme damage done to the normal compressed yeast by the quick freezing procedure, and the added punishment given this material when held in a frozen state for normal distribution periods. A progressive weakening in the leavening power of the yeast occurs during the time before it reaches the consumer. This means that the consumer is faced with an extreme variability in the time required for the dough to raise to the proper height to produce a satisfactory roll. We have made the novel discovery that our yeast dried to a moisture level of from about 15% to about 25% has greatly enhanced resistance to the foregoing damage.

Table 5 illustrates the comparative fermentation performance of a yeast dried to a moisture of 21.7% as compared to conventional 70% pressed cake and 9.2% active dry yeast in frozen rolls over a three week period. These data demonstrate the superiority of a yeast dried to a moisture level from about 15 to about 25%.

TABLE 5

| Moisture Content of Yeast, percent | Dough Gas ($CO_2$) Evolved, mm. Hg | | |
|---|---|---|---|
| | Initially | 1 Week | 3 Weeks |
| 70 | 460 | 207 | 182 |
| 21.7 | 643 | 459 | 383 |
| 9.2 | 450 | 322 | 226 |

Microscopic examination of the yeast samples after storage at 40° F. for 4 weeks, shows that, while no bacteria have developed in those samples at moisture levels between 15% and 25%, the pressed cake samples (70% moisture) contain greatly increased number of bacteria which have developed during storage of the yeast sample.

Physical characteristics of the yeast seem most satisfactory at moisture contents between about 25% and about 15%. In this moisture range the yeast is in distinct particles which can be handled and packaged easily yet contains sufficient moisture to resist fracture and dusting.

Thus, it is apparent that we have provided a novel bakers' yeast and a novel method of preparing same having a moisture content of from about 15% to about 25% which fulfills all of the objects and advantages sought therefor.

Specifically, the novel bakers' yeast of the present invention is not susceptible to "cold shock" when suspended in cool water, does not have excessive proteolytic activity or glutathione content, has lost essentially none of its fermentative capacity when employed in the three baking processes most commonly used today, possesses better stability than compressed yeast and is sufficiently stable for all practical purposes, and does not support the development of incidental contaminating bacteria as does compressed yeast.

This invention is intended to cover all changes and modifications of the examples of the invention herein chosen for purposes of the disclosure, which do not constitute departures from the spirit and scope of the invention.

What is claimed is:

1. A method of producing a bakers' yeast which will support substantially no growth of incidental contaminating bacteria and which loses substantially none of its fermenting power when suspended in cold water, including the steps of drying a good quality yeast of about 70% moisture to a moisture content of from about 15% to about 25% in less than about four hours, and recovering yeast having a glutathione value of less than about 10 and including from about 15% to about 25% moisture.

2. A method of producing a bakers' yeast which will support substantially no growth of incidental contaminating bacteria and which loses less than about 5% of its fermenting power when suspended in cold water, including the steps of selecting a bakers' yeast having a protein content of from about 38% to about 48%, drying said yeast in ambient air for about 4 hours, and recovering a yeast product consisting essentially of yeast cells and about 20% water and having a glutathione value of from about 2 to about 10.

3. A method of producing a bakers' yeast including the steps of selecting a yeast having a protein content of from about 38% to about 48% and a $P_2O_5$ value of about 1.8–2.4, drying the yeast in ambient air for less than about four hours, and recovering a yeast product having a moisture content of from about 15% to about 25% and a glutathione value of from about 2 to about 10, said yeast showing less than about 5% loss of fermentation capacity when suspended in water at a temperature of about 45° F.

4. A process for producing baked goods from a dehydrated yeast comprising the steps of including in a dough an amount of rehydrated yeast equal to the amount of compressed yeast normally used on a dry solids basis, said yeast having a glutathione value of less than 10 and a moisture content of from about 15% to about 25% before rehydration and rehydrated with water at a temperature below 110° F., fermentating the dough without the loss of fermentation activity normally associated with a reconstituted active dry yeast when incorporated in a dough, and baking said dough to produce baked goods of equivalent texture to those baked with compressed yeast.

5. A process for producing baked goods from a dehydrated yeast comprising the steps of rehydrating yeast having a glutathione value of less than 10 and a moisture content of from about 15% to about 25% with water at a temperature below 110° F., including in a dough an amount of said rehydrated yeast equal to the amount of compressed yeast normally used on a dry solids basis, fermentating the dough without the loss of fermentation activity normally associated with a reconstituted active dry yeast when incorporated in a dough, and baking said dough to produce baked goods of equivalent texture to those baked with compressed yeast.

6. In a process for producing baked goods using dehydrated yeast including the steps of mixing the flour, water, dehydrated yeast, and other ingredients to form a dough of proper consistency, fermenting the dough, scaling off, shaping, proofing and baking, the improvement which includes incorporating a yeast containing from about 38% to about 48% protein, a $P_2O_5$ of 1.8–2.4%, from about 15% to about 25% moisture, and a glutathione value of less than about 10 into the dough at temperatures from about 45° F. to about 110° F. without significant loss of fermentation activity over that of compressed yeast.

7. In a process for producing baked goods by the sponge-dough process using a dehydrated yeast including the steps of mixing flour, water, dehydrated yeast and other sponge ingredients to form a dough of proper consistency, fermenting the sponge, adding remaining water and other dough ingredients, remixing, fermenting, scaling, shaping, proofing and baking, the improvement which comprises incorporating a dehydrated yeast containing from about 38% to about 48% protein, a $P_2O_5$ of 1.8–2.4%, from about 15% to about 25% moisture, and a glutathione value of less than about 10 into the dough at temperatures from about 45° F. to about 110° F. without significant loss of fermentation activity.

8. In a process for producing baked goods by the brew process using dehydrated yeast including the steps of dissolving dehydrated yeast in water and mixing with other bread ingredients, allowing the brew to ferment for several hours, mixing the brew with the flour, shortening and oxidizing agents to form a dough of proper consistency, scaling into pans, proofing and baking, the improvement which comprises rehydrating a yeast containing from about 38% to about 48% protein, a $P_2O_5$ of 1.8–2.4%, from about 15% to about 25% moisture, and a glutathione value of less than about 10 at temperatures from about 45° F. to about 110° F. without significant loss of fermentation activity.

9. A process for producing doughs for quick-frozen rolls comprising the steps of incorporating a yeast containing from about 38% to about 48% protein, a $P_2O_5$ of 1.8–2.4%, from about 15% to about 25% moisture and a glutathione value of less than about 10 into a roll dough at a temperature from about 45° F. to about 110° F., cutting the dough, and freezing the dough to about —20° F.

10. A process for producing doughs for quick-frozen rolls comprising the steps of preparing an aqueous yeast suspension from dehydrated yeast containing from about 38% to about 48% protein, a $P_2O_5$ of 1.8–2.4%, from about 15% to about 25% moisture, and a glutathione value of less than about 10, and water at temperatures from 45° F. to about 110° F., incorporating the rehydrated yeast into a roll dough, cutting and freezing the dough to about —20° F. without significant loss of fermentation activity.

11. A method of reconstituting dehydrated years including the step of combining yeast having a moisture content of about 15–25% and a glutathione value of about 2–10 with water at a temperature of from 45° F. to below 110° F., said rehydrated yeast having less than 5% loss of fermentating value compared to compressed yeast of 70% moisture content.

12. A method of improving the fermentation properties of reconstituted dehydrated yeast including the steps of drying bakers' yeast having a protein content of about 38–48%, a $P_2O_5$ of 1.8–2.4 and a moisture content of about 70% for less than about four hours in ambient air, recovering a dehydrated yeast having a moisture content of about 15–25% and a glutathione value of less than about 10, and reconstituting said yeast in water at a temperature of 45–110° F., said rehydrated yeast showing less than 5% loss of fermentation power as compared to the original compressed yeast.

13. A method of producing a bakers' yeast including the steps of drying a yeast having a protein content of from about 38% to about 48% to a moisture content of about 15–25%, and recovering a yeast product consisting essentially of yeast cells having a glutathione value of less than about 10 and from about 15% to about 25% moisture.

References Cited in the file of this patent

UNITED STATES PATENTS

| | | |
|---|---|---|
| 1,306,569 | Whitney | June 10, 1919 |
| 1,420,557 | Klein | June 20, 1922 |
| 1,701,081 | Nilsson | Feb. 5, 1929 |
| 1,910,265 | Shaver | May 23, 1933 |
| 1,974,938 | White | Sept. 25, 1934 |

FOREIGN PATENTS

| | | |
|---|---|---|
| 202,030 | Great Britain | Aug. 10, 1923 |
| 1,006,344 | France | Apr. 22, 1952 |

UNITED STATES PATENT OFFICE
CERTIFICATE OF CORRECTION

Patent No. 3,089,774            May 14, 1963

Robert J. Sumner et al.

It is hereby certified that error appears in the above numbered patent requiring correction and that the said Letters Patent should read as corrected below.

Column 2, line 10, for "convention" read -- conventional --; column 6, TABLE 4, under the heading "After 4 Weeks, percent", for

| | |
|---|---|
| 13 | 18 |
| 0 | 3 |
| 0   read | 0 |
| 0 | 0 |
| 8 | 0 |
| 0 | 0 | column 9, line 16, for "years" read -- yeast --.

Signed and sealed this 5th day of November 1963.

(SEAL)
Attest:

ERNEST W. SWIDER        EDWIN L. REYNOLDS

Attesting Officer        Acting Commissioner of Patents